June 3, 1947.  D. L. SMITH  2,421,469
EXHAUST HOOD FOR WELDING MACHINES
Filed Oct. 21, 1944  3 Sheets-Sheet 1

INVENTOR.
DONALD L. SMITH
BY
Pennie, Davis, Marvin & Edmonds
ATTORNEYS

June 3, 1947.　　　　D. L. SMITH　　　2,421,469
EXHAUST HOOD FOR WELDING MACHINES
Filed Oct. 21, 1944　　　3 Sheets-Sheet 2
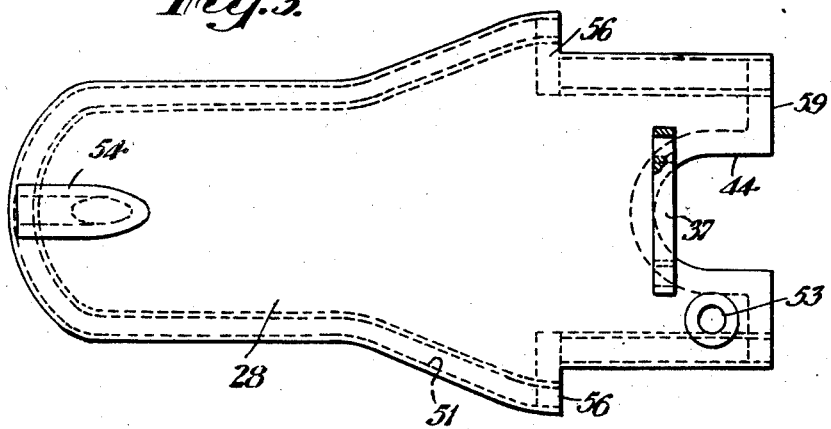
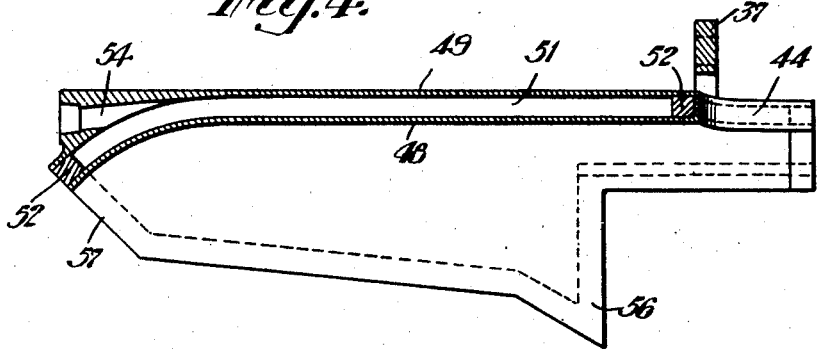
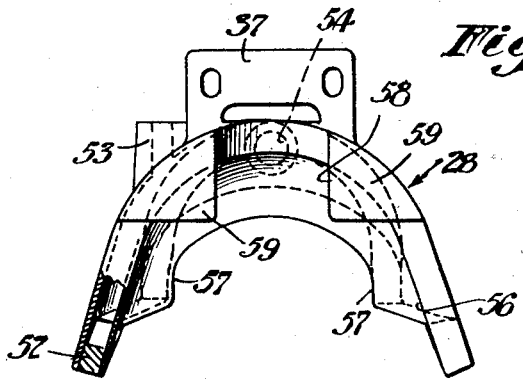
INVENTOR.
DONALD L. SMITH
BY
ATTORNEYS June 3, 1947.　　　　　D. L. SMITH　　　　　2,421,469
EXHAUST HOOD FOR WELDING MACHINES
Filed Oct. 21, 1944　　　　3 Sheets-Sheet 3
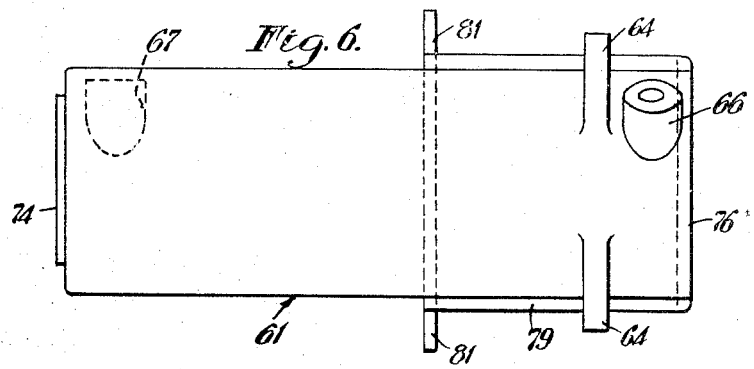
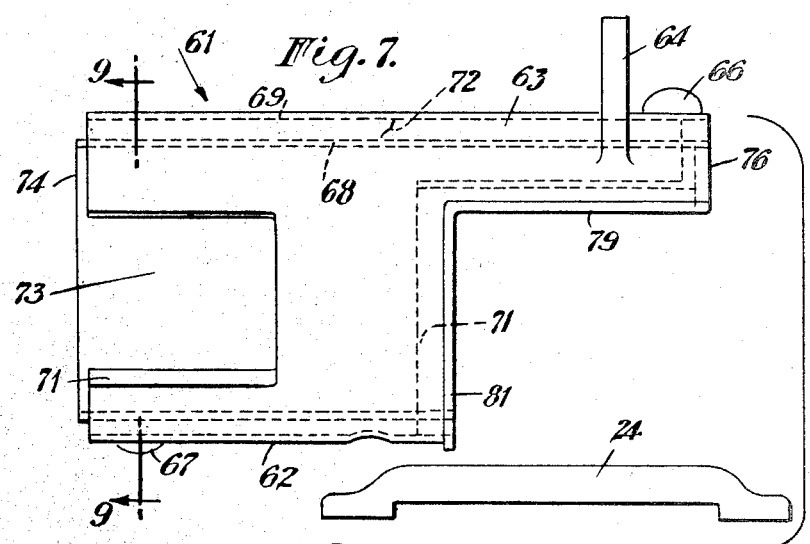
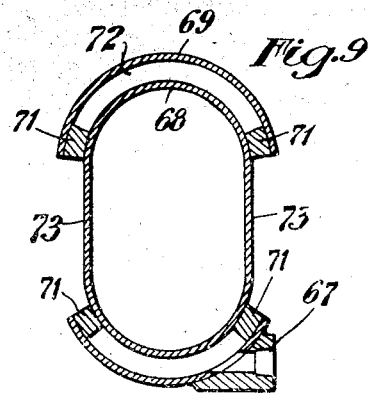
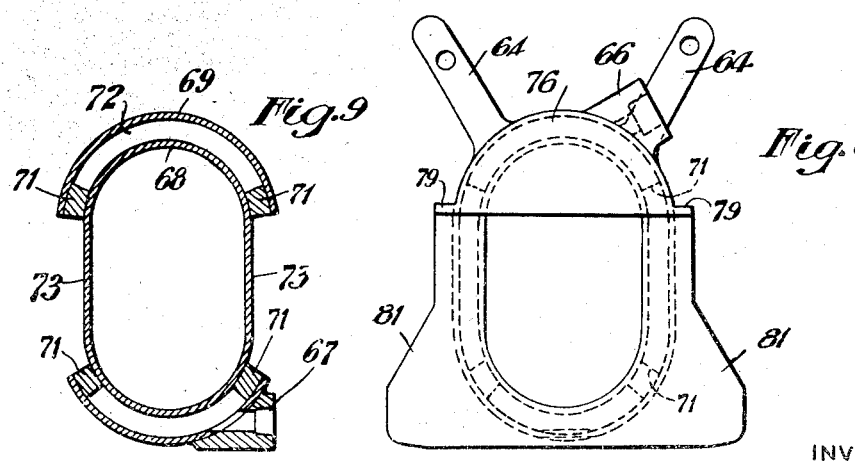
INVENTOR
DONALD L. SMITH
BY
Pennie, Davis, Marvin & Edmonds
ATTORNEYS Patented June 3, 1947

2,421,469

UNITED STATES PATENT OFFICE 2,421,469

EXHAUST HOOD FOR WELDING MACHINES

Donald L. Smith, Dunellen, N. J., assignor to Air Reduction Company, Incorporated, a corporation of New York Application October 21, 1944, Serial No. 559,854

5 Claims. (Cl. 113—59)

This invention relates to welding machines and more particularly to hoods for exhausting gases and products of combustion resulting from the preheating or welding operation upon the workpiece. More specifically, the exhaust mechanism of the present invention is adapted for use with welding machines of the gas torch type for seam-welding barrels, large tubes and the like.

It is an object of the invention to provide a barrel welding machine with an exhaust mechanism to draw off the envelope gases and products of combustion from the region of application of the gas torch so that the parts of the machine will not become overheated and so that the attendant can approach closer to the zone of weld to inspect the welding operation.

According to the invention, a water-cooled hood is extended over the torch and along the line of weld. Gases and products of combustion drawn into the hood pass down through a pipe extending horizontally under the machine housing and into the lower end of a flue where there is provided a nozzle for blowing compressed air up the flue to induce a draft therein. About the outlet end of the nozzle is an injector sleeve that forms a throat in the flue for increasing the injector action of the air jet. The flue is connected to the machine housing at only one region so that the length of the horizontal piping can change freely with the temperature. The vertical flue intermediate its length and nearer to its lower end is pivoted in a bracket carried on the machine housing. As the horizontal pipe expands or contracts the flue is merely tilted. The flue is of sufficient height that once the draft is started by the compressed air jet a chimney effect is produced to maintain the draft and draw off the gases and products of combustion from the zone of weld.

For a better understanding of the invention, reference may be had to the following detailed description taken in connection with the accompanying drawing, in which Fig. 1 is an elevational view of the exhaust mechanism of the present invention and of portions of a barrel welding machine;

Figs. 3, 4, 5 are respectively plan, cross-sectional, and end elevational views of the form of exhaust hood used with the exhaust mechanism for drawing off the products of combustion resulting from the preheating operation;

Figs. 6, 7, 8 are respectively similar views of the form of exhaust hood used with an adjacent independent exhaust mechanism for drawing off the gases resulting from the subsequent welding operation, this hood being narrower than the preheating hood and formed to be disposed between mill roll sets which are closer together than the mill roll sets at the preheating station;

Fig. 9 is a cross-sectional view of the latter exhaust hood and taken along line 9—9 of Fig. 7.

Figure 1:
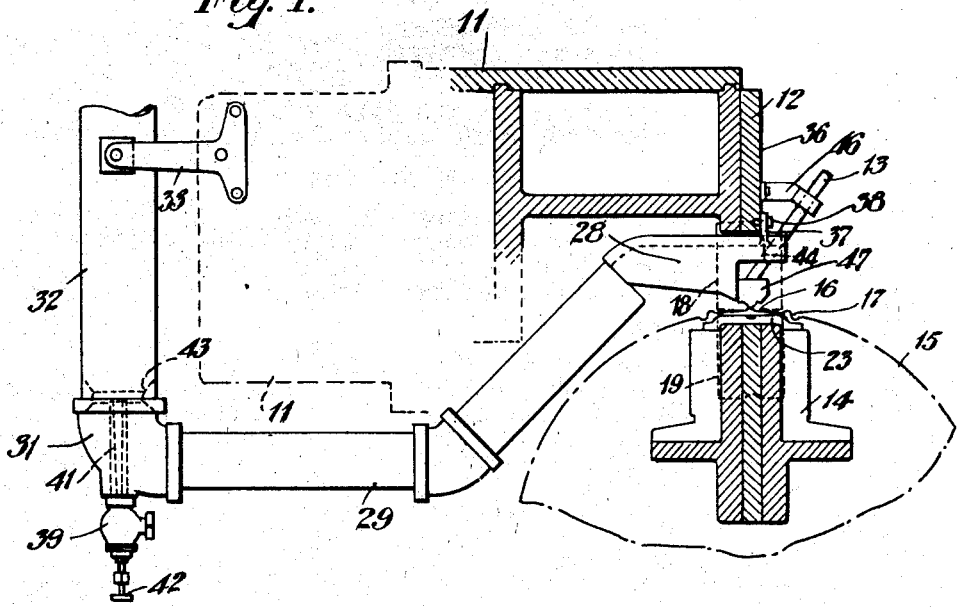
Figure 2:
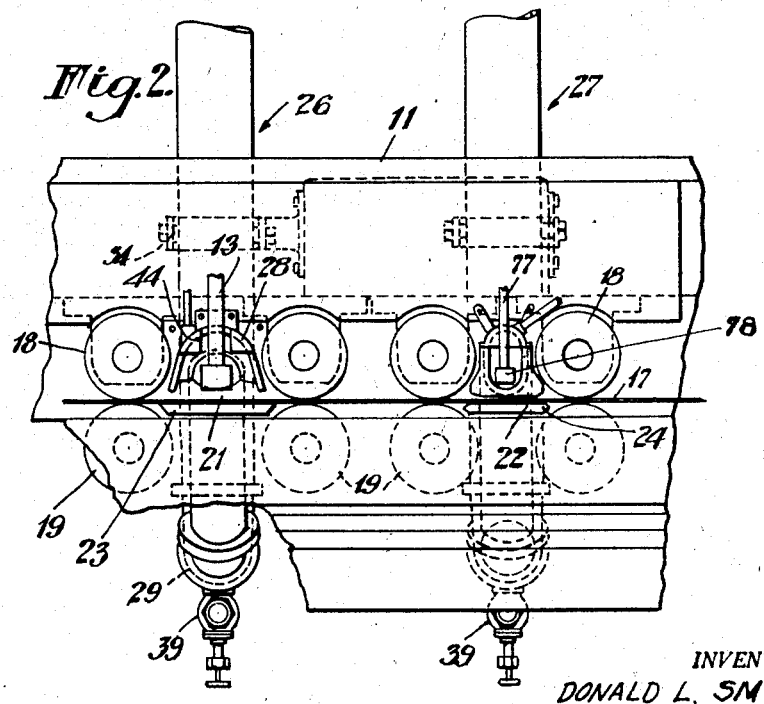
Fig. 2 is an end elevational view of portions of the exhaust mechanisms as viewed by the operator and looking into the ends of the exhaust hoods.

Referring to Figs. 1 and 2, there is shown a welding machine housing 11 having an overhanging bracket 12 carrying a torch 13 and a work support 14 for slidably supporting barrel 15 or the like while having its edges preheated and welded together at 16 as the barrel is axially moved along the support. The end edges of the barrel are crimped at 17 to prevent the barrels as they are moved along the support from overriding one another. On the bracket 12 is a series of upper mill rolls 18 engaging the barrel outer surface at 16 and cooperating respectively with lower mill rolls 19 pivoted on the work support 14 and engaging barrel inner surface. Two sets of these cooperating mill rolls are provided at both preheating station 21 and welding station 22. At each station and intermediate the sets of mill rolls are bearing support plates 23, 24. But the set of rolls at the preheating station are spaced farther apart than the sets of rolls at the welding station and consequently the hoods forming part of the exhaust mechanisms are fashioned differently at the respective stations. There are two exhaust mechanisms or devices 26, 27 provided with the machine, one at each station, and the only difference between the mechanism being in the shape of the associated hood part.

Secured to the bracket 12 is a hood 28 of substantially open funnel shape and tapering rearwardly to fit the end of a pipe 29 which extends downwardly and horizontally under the machine housing 11 to the opposite sides thereof. Extending upwardly from a fitting 31 on the end of the horizontal pipe 29 is a flue 32 of proper length to give the desired natural chimney effect to the gases to be drawn off.

This flue is connected to the machine housing at only one region so that upon expansion or contraction of the pipe 29, due to temperature changes therein, the flue will only be tilted and not dislocated from its connection should the connection to the housing be made in multiple regions thereon. For this purpose, a bifurcated bracket 33 is provided on the main housing 11 close to the fitting 31 of the horizontal pipe 29. Such bracket provides a trunnion support for trunnion bolts 34 in the flue 32. On this support, flue 32 pivots as the horizontal pipe 29 expands or contracts. The pipe 29 is fixed against displacement at its forward end by the hood part 28 which is secured to the front face 36 of the overhanging bracket 12. For this purpose, lug formation 37 is provided on the top of the hood 28 through which fastening bolts 38 are extended and screwed into front face 36.

The pipe fitting 31 is fashioned to receive a compressed air fitting 39 having a nozzle 41 for directing an air jet upwardly into the flue 32 to induce a draft therein. After the draft has been induced in the flue, the ordinary natural chimney draft effect will maintain the draft and the compressed air can be turned off by handle 42 of the fitting. An injector sleeve 43 is disposed in the flue to provide a throat portion about the air jet and thereby increase the injector action thereof.

Torch 13 extends downwardly through a slot 44 in the top of the hood 28, Figs. 1, 3, and at an angle to clear the front face 36. The torch is supported in this position by a bracket 46 on the front face 36. On its lower end and under the hood is a special nozzle tip 47 adapted to direct heating flames against the opposing seam edges of the barrel which are to be welded.

The hood 28 is made from similarly folded sheets 48, 49 spaced apart to provide a cooling water chamber 51, Fig. 4. Spacing pieces 52 are disposed between the sheets around their outer periphery and secured to the sheets as by welding to make the chamber 51 watertight. Water inlet 53 and outlet 54 for the chamber 51 are provided in upper folded sheet 49. The general shape of the hood is open funnel shape narrowing from flared portions 56 to a rear point 57 where it is connected to the pipe 29. The slot 44 not only extends horizontally but vertically as indicated at 58 and at the sides thereof are depending front portions 59.

Referring to Figs. 6 to 9, a hood 61 shaped somewhat differently than hood 28 is shown in detail. Hood 61 necessarily has this shape as it is disposed between the more narrowly spaced mill roll sets at the welding station 22. The remainder of the exhaust mechanism 27 is the same as the preheating exhaust mechanism just described.

Hood 61 has a closed bottom portion 62 and a large overhanging portion 63 with separated lugs or ears 64 for anchoring the mechanism 27 to the overhanging bracket front face 36. Water inlet 66 and outlet 67 are respectively provided at opposite ends of the hood. This hood 61 is made from inner and outer sheets 68, 69 held spaced apart by pieces 71 to provide cooling water chamber 72. At the rearward end of the hood, gaps are left in the outer sheet 69 to leave uncooled inner sheet portion 73. Inner sheet 68 also extends rearwardly beyond the outer sheet 69 to provide a lip portion 74 for the attachment thereto of pipe 29.

The forward end of the overhanging portion 62 is closed by a vertical wall 76. Torch 77 extends under vertical wall 76 and portion 62 to locate its torch tip 78 adjacent the barrel edges for dispersing final flames upon them to bring the same to the welding or fusion temperature just prior to barrel edges being brought together by the final mill roll set.

To further aid in the capture of the gases and products of combustion, laterally extending flanges 79 are provided on the longitudinal edges of the overhang portion 63 of the hood 61 and vertically and radially extending flanges 81 on the front of the hood 61 and at the rear of the overhang portion 63.

What is claimed is:

1. In combination, a seam welding machine for welding metal barrels, tubes or the like including a support for the barrels or the like while being progressed through the welding machine, a bracket overhanging the support in alignment with the seam edges of the barrel or the like to be welded, two sets of mill rolls located in spaced relation to one another along the support, one roll of each set carried on the support to engage the inner surface of the barrel or the like and other roll of the set cooperating with the support roll and carried by the overhanging bracket to engage the outer surface of the barrel or the like, a torch located between said sets of rolls and adapted to direct heating flames upon the barrel seam edges, and an exhaust mechanism for drawing off the products of combustion resulting from the heating operation upon the seam edges comprising an exhaust hood disposed between said sets of mill rolls over the torch tip and supported upon the overhanging bracket, said hood being arched about an axis extending laterally of the machine and having an open end through which the welding operation can be observed a conducting pipe and flue for receiving the products of combustion collected by the hood extending laterally under the bracket and upwardly to provide a chimney by which a natural draft is formed to effect a drawing action upon the products of combustion enveloped by the hood.

2. The combination set forth in claim 1 and an injector nozzle at the lower end of the chimney for blowing an air jet up the chimney to induce a draft therein and an injector sleeve within the flue and about the injector nozzle to provide a throat portion in the flue for increasing the injector action of the air jet.

3. In combination, a flame welding machine having a support for the work-piece and a bracket overhanging the support, a torch under the bracket for directing heating flames upon the work-piece, and exhaust mechanism for drawing off the products of combustion resulting from the heating operation upon the work-piece comprising a hood connected to the bracket and extending over the torch, a pipe and flue connected to the hood and extending rearwardly therefrom underneath the bracket and vertically to produce a chimney effect therewithin, and means for pivotally connecting the vertical portion of the flue to the machine at only one region along its length so that the pipe can change freely in length with change of temperature and without dislocating the hood or flue.

4. In combination, a heating apparatus having a support for the work-piece to be heated and a bracket extending over the support, an exhaust device for drawing off the products of combustion resulting from the heating operation upon the work-piece comprising an enveloping hood adapted to be fitted under the bracket and attached thereto, a conducting pipe and flue connected to the hood and extending horizontally and then vertically to obtain a chimney effect therewithin, and a single pivot means for supporting the flue at a point rearwardly of the hood and vertically upwardly from the pipe whereby horizontal expansion of the pipe may be effected without dislocating the hood or flue.

5. In a seam welding machine, a support for the work-piece, a torch for directing heating flames on the seam edges, and means for exhausting the products of combustion resulting from the heating operation upon the seam edges including an exhaust hood supported above the torch tip and which is arched about an axis extending laterally of the seam to be welded, said hood extending rearwardly along said axis to conduct the products of combustion to a place of connection with an exhaust pipe, an exhaust pipe connected to the hood at said place and comprising an upwardly extending flue portion forming a chimney, the hood having an open forward end through which the welding operation can be observed, and said chimney serving to produce a draft which draws the products of combustion rearwardly from said open end of the hood into and up through the chimney.

DONALD L. SMITH.

REFERENCES CITED

The following references are of record in the file of this patent:

UNITED STATES PATENTS

| Number | Name | Date |
| --- | --- | --- |
| 2,361,861 | Masowich | Oct. 31, 1944 |
| 2,064,085 | Shippy | Dec. 15, 1936 |
| 1,716,096 | Weeks | June 4, 1929 |
| 2,210,370 | Herradora | Aug. 6, 1940 |
| 2,336,283 | Neill | Dec. 7, 1943 |